United States Patent
McArdle

(10) Patent No.: US 10,887,120 B2
(45) Date of Patent: Jan. 5, 2021

(54) AUTOMATED VIDEOCONFERENCE SYSTEMS, CONTROLLERS AND METHODS

(71) Applicant: Zeller Digital Innovations, Inc., Normal, IL (US)

(72) Inventor: Justin McArdle, Heyworth, IL (US)

(73) Assignee: Zeller Digital Innovations, Inc., Normal, IL (US)

(*) Notice: Subject to any disclaimer, the term of this patent is extended or adjusted under 35 U.S.C. 154(b) by 0 days.

(21) Appl. No.: 16/192,405

(22) Filed: Nov. 15, 2018

(65) Prior Publication Data

US 2019/0149347 A1 May 16, 2019

Related U.S. Application Data

(60) Provisional application No. 62/641,860, filed on Mar. 12, 2018, provisional application No. 62/586,420, filed on Nov. 15, 2017.

(51) Int. Cl.
| | |
|---|---|
| *H04L 12/18* | (2006.01) |
| *H04N 7/15* | (2006.01) |
| *H04W 12/06* | (2009.01) |
| *H04W 12/08* | (2009.01) |
| *H04M 3/56* | (2006.01) |

(Continued)

(52) U.S. Cl.
CPC ...... *H04L 12/1818* (2013.01); *H04L 12/1822* (2013.01); *H04M 3/565* (2013.01); *H04M 3/567* (2013.01); *H04N 7/147* (2013.01); *H04N 7/152* (2013.01); *H04W 12/06* (2013.01); *H04W 12/08* (2013.01); *H04W 80/10* (2013.01)

(58) Field of Classification Search
CPC .......... H04N 7/147; H04N 7/152; H04N 7/15; H04L 12/1818; H04L 12/1822; H04L 65/1069; H04W 12/08; H04W 80/10; H04W 12/06; H04M 3/567; H04M 3/565; H04M 3/563

See application file for complete search history.

(56) References Cited

U.S. PATENT DOCUMENTS

| | | | |
|---|---|---|---|
| 7,586,857 B2 | 9/2009 | Ejzak et al. | |
| 9,585,185 B1* | 2/2017 | Sapkota | H04L 65/105 |
| 9,807,059 B2 | 10/2017 | Stahl | |

(Continued)

*Primary Examiner* — Muhammad Raza
(74) *Attorney, Agent, or Firm* — Harness, Dickey & Pierce, P.L.C.

(57) ABSTRACT

An example videoconferencing system includes a server, a videoconferencing codec, and a system controller in communication with the videoconferencing codec and the server via one or more wired and/or wireless communication networks. The system also includes a mobile computing device adapted to communicate with the server via the one or more wired/and or wireless communication networks. The mobile computing device includes a user interface. The mobile device is configured to parse information stored on the mobile computing device according to a parsing protocol to obtain information regarding a scheduled conference call, and to transmit at least a portion of the information regarding the scheduled conference call to the server in response to user input. The server is configured to transmit the information regarding the scheduled conference call to the system controller, and the system controller is configured to initiate the scheduled conference call via the videoconferencing codec.

18 Claims, 3 Drawing Sheets

(51) Int. Cl.
*H04W 80/10* (2009.01)
*H04N 7/14* (2006.01)

(56) References Cited

U.S. PATENT DOCUMENTS

| | | | |
|---|---|---|---|
| 2004/0266412 A1* | 12/2004 | Maes | G06Q 10/10 |
| | | | 455/414.4 |
| 2005/0021620 A1* | 1/2005 | Simon | H04N 7/147 |
| | | | 709/204 |
| 2008/0219227 A1* | 9/2008 | Michaelis | H04L 12/185 |
| | | | 370/338 |
| 2009/0220064 A1* | 9/2009 | Gorti | H04M 3/56 |
| | | | 379/202.01 |
| 2013/0143539 A1* | 6/2013 | Baccay | H04L 12/1822 |
| | | | 455/416 |
| 2014/0125759 A1* | 5/2014 | Chalasani | H04N 7/152 |
| | | | 348/14.09 |
| 2014/0160225 A1 | 6/2014 | Baldelli et al. | |
| 2015/0130891 A1 | 5/2015 | Chen et al. | |
| 2016/0021254 A1* | 1/2016 | Red | H04M 3/565 |
| | | | 379/202.01 |
| 2016/0165056 A1 | 6/2016 | Bargetzi et al. | |
| 2016/0261653 A1* | 9/2016 | Kim | H04L 65/403 |
| 2018/0082263 A1* | 3/2018 | Michels | G06Q 10/1095 |
| 2018/0234471 A1* | 8/2018 | Qian | H04N 7/15 |

* cited by examiner

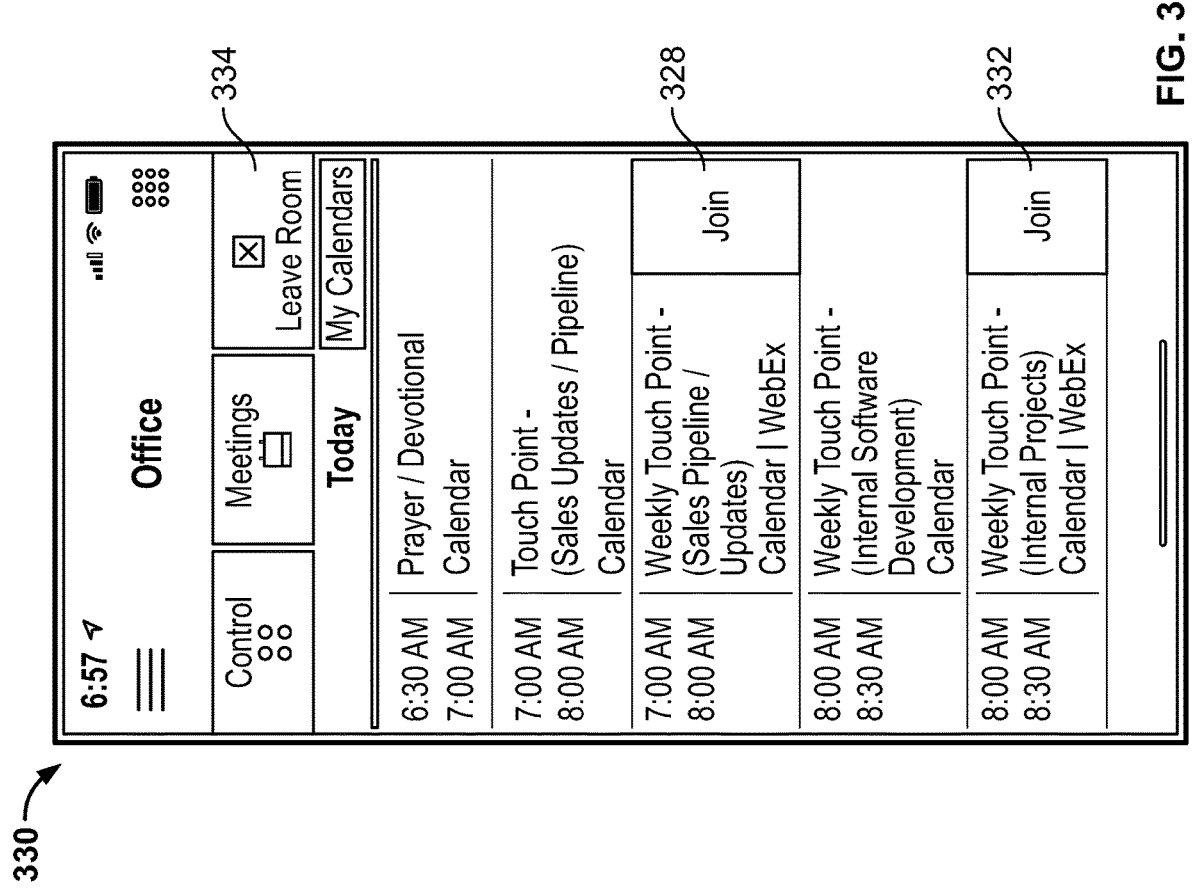

AUTOMATED VIDEOCONFERENCE SYSTEMS, CONTROLLERS AND METHODS

CROSS-REFERENCE TO RELATED APPLICATIONS

This application claims the benefit and priority of U.S. Provisional Application No. 62/586,420, filed Nov. 15, 2017, and U.S. Provisional Application No. 62/641,860, filed Mar. 12, 2018. The entire disclosures of each of the above applications are incorporated herein by reference.

BACKGROUND

This section provides background information related to the present disclosure which is not necessarily prior art.

Various types of videoconferencing systems are known, including those described in U.S. patent application Ser. No. 14/216,183 (now U.S. Pat. No. 9,462,225), filed on Mar. 17, 2014. The entire disclosure of the above application is incorporated herein by reference.

Typically, a videoconferencing room includes a system controller connected to a codec and other components in the room. The system controller includes a user interface such as a keypad, touchscreen and/or handheld remote to control the codec and other components in the room.

Some videoconferencing systems require that a mobile phone application and a codec are registered to a same proprietary cloud-based service (e.g., CISCO SPARK). A server in the cloud may store scheduled conference call information for the registered codec, and transmit information regarding the scheduled conference call to the registered mobile phone application to allow a user of the mobile phone application to initiate the scheduled conference call stored on the server. This approach is limited to specific videoconferencing components and videoconferencing service providers that are registered with the proprietary cloud-based service.

SUMMARY

This section provides a general summary of the disclosure, and is not a comprehensive disclosure of its full scope or all of its features.

In some cases, personal information (e.g., an individual calendar, email, contacts, etc.) on a mobile computing device that a user brings into a videoconferencing room may be different than information that is available to videoconferencing components in the room (e.g., a videoconferencing codec, etc.). This may create a burdensome situation for the user in setting up a conference call based on the user's personal information, because the user may have to locate conference call information on the mobile computing device, manually enter conference call information in the videoconferencing codec, etc.

In some embodiments of the present disclosure, a videoconferencing system may allow for joining a scheduled conference call using simple user input from a mobile computing device, and the same user interface may be used for multiple videoconferencing rooms, videoconferencing components, etc. For example, the user may open a control application on the mobile device and initiate a scheduled conference call by clicking a button, etc. Videoconferencing call control, information, etc. may be handled in the background with respect to the user. The user may initiate the scheduled conference call without having to locate a dialer for a meeting, without having to dial a phone number for the conferencing call or input an ID or PIN for the meeting, etc.

According to one aspect of the present disclosure, an example videoconferencing system includes a server, a videoconferencing codec, and a system controller in communication with the videoconferencing codec via one or more wired and/or wireless communication networks to control the videoconferencing codec. The system controller is in communication with the server via the one or more wired and/or wireless communication networks. The system also includes a mobile computing device adapted to communicate with the server via the one or more wired/and or wireless communication networks. The mobile computing device includes a user interface. The mobile device is configured to parse information stored on the mobile computing device according to a parsing protocol to obtain information regarding a scheduled conference call, and to transmit at least a portion of the information regarding the scheduled conference call to the server in response to user input. The server is configured to transmit the information regarding the scheduled conference call to the system controller, and the system controller is configured to initiate the scheduled conference call via the videoconferencing codec.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is an illustration of an example user interface of the mobile computing device of FIG. 1.

DETAILED DESCRIPTION

Figure 1:
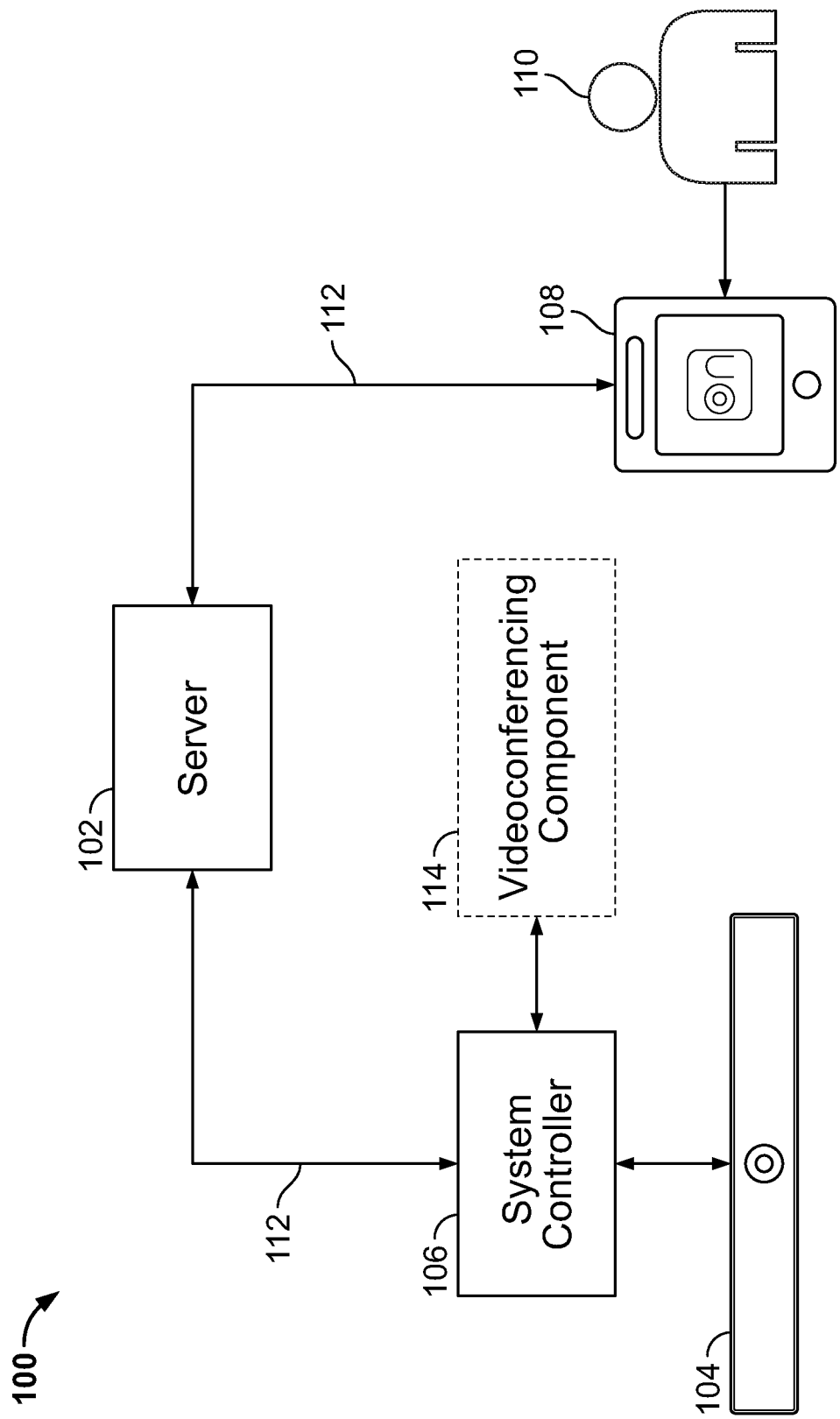
FIG. 1 is a diagram of a videoconferencing system according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A videoconferencing system according to one example embodiment of the present disclosure is illustrated in FIG. 1, and indicated generally by reference number 100. As shown in FIG. 1, the system 100 includes a server 102, a videoconferencing codec 104, and a system controller 106 in communication with the videoconferencing codec 104 via one or more wired and/or wireless communication networks 112 to control the videoconferencing codec 104. The system controller 106 is also in communication with the server 102 via the one or more wired and/or wireless communication networks 112.

The system 100 further includes a mobile computing device 108, such as a smartphone, a tablet computer, a laptop computer, etc. Although FIG. 1 illustrates the mobile computing device 108 as a smartphone, other mobile computing devices can be used similarly.

The mobile computing device 108 includes a user interface (e.g., a keypad, a touchscreen, etc.) to receive input from a user 110, and the mobile computing device 108 is adapted to communicate with the server 102 via the one or more wired/and or wireless communication networks 112.

The mobile computing device 108 is configured to parse information (e.g., calendar events, emails, etc.) stored on the mobile computing device 108 according to a parsing protocol to obtain information regarding a scheduled conference call, and to transmit at least a portion of the information regarding the scheduled conference call to the server 102 in response to user input.

The server 102 is configured to transmit the information regarding the scheduled conference call to the system controller 106, and the system controller 106 is configured to initiate the scheduled conference call via the videoconferencing codec 104.

The mobile computing device 108 may include a control application such as a smartphone app, a computer program, etc., which may be stored in a memory of the mobile computing device 108. Although FIG. 1 illustrates a smartphone 108 including a smartphone app, other control applications can be used similarly. One example smartphone app is ROOMREADY CONNECT distributed by Zdi, Inc. of Normal, Ill.

The smartphone app may use one or more libraries to pull information (e.g., calendar event data, emails, etc.) from the smartphone 108, and parse the information to obtain details regarding a scheduled conference call. For example, calendar invites, email invites, etc. from videoconferencing services typically have a standardized format that may easily be gathered and processed by the smartphone app. For example, calendar events, emails, etc., stored on the smartphone 108 may be parsed by the smartphone app to search for indicators of a scheduled conference call.

In some embodiments, the smartphone app may search multiple stored calendar events for one or more text and/or numeric strings indicative of the scheduled conference call. For example, a calendar event that includes a session initiation protocol (SIP) uniform resource identifier (URI), a videoconferencing phone number, a videoconferencing meeting number, a personal identification (PIN) number, a passcode, etc., may be indicative of a scheduled conference call.

The smartphone app may search multiple stored calendar events, emails, etc. to identify text and/or numeric strings including a SIP URI, videoconferencing phone number, meeting number, PIN number, passcode, etc., to identify an upcoming scheduled conference call. In some cases, videoconferencing providers may use a standard textual format for invites to conference calls, and the smartphone app may search the multiple calendar events to identify formatted text that corresponds to a specific videoconferencing provider invite, which indicates an upcoming scheduled conference call.

Figure 2:
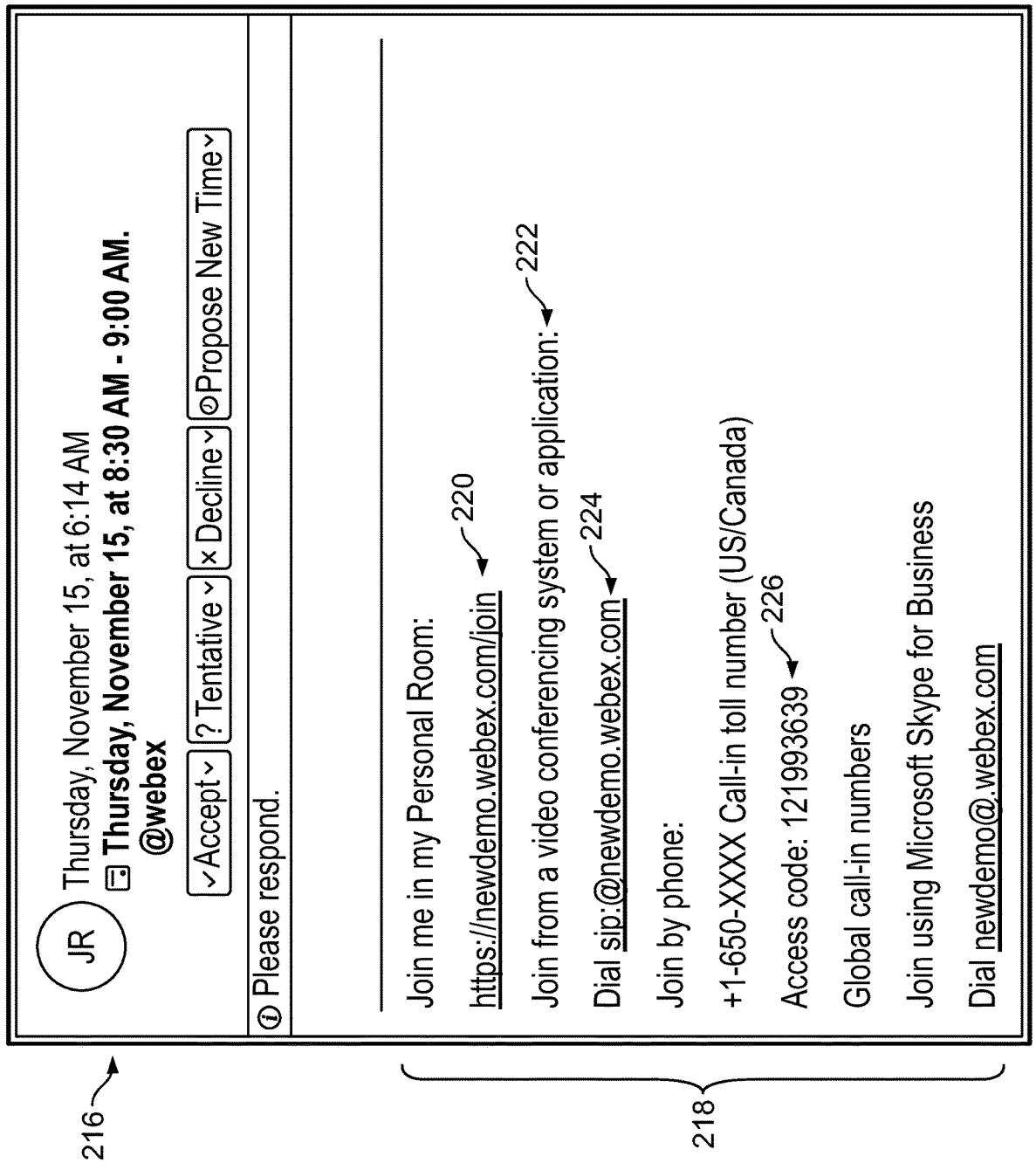
FIG. 2 is an illustration of an example calendar event stored on the mobile computing device of FIG. 1.

An example calendar invite 216 is illustrated in FIG. 2. The calendar invite includes a body 218 including details of a scheduled conference call. The details may be provided in a text format from an application programming interface (API) of a calendar application (e.g., MICROSOFT Office 365, GOOGLE calendar, etc.).

The calendar invite 216 may be parsed by the smartphone app to search for specified profiles, formats, etc. indicative of scheduled conference calls. In FIG. 2, a keyword 220 and 222 in the body 218 indicate a WEBEX conference call is scheduled for a "video conferencing system."

In response to matching the keywords 220 and 222, the smartphone app may search for "sip:xxx@xxx.webex.com" at 224, to determine information needed to initiate a call at the videoconferencing codec 104. The smartphone app may also search for an access code at 226, and transmit the obtained access code to the videoconferencing codec 104 via the server 102 to initiate the conference call. Although FIG. 2 illustrates a WEBEX example, the smartphone app may similarly search calendar invites for conference calls scheduled by other videoconferencing providers, in other invite scheduling formats, etc.

The smartphone app may parse calendar events within a defined time period to search for scheduled conference calls. For example, the smartphone app could search calendar events within an hour from a current time, within a day, within a week, etc.

Referring back to FIG. 1, once the smartphone app obtains the information regarding the scheduled conference call, the smartphone 108 transmits (e.g., in response to user input) at least a portion of the obtained information regarding the scheduled conference call to the server 102 through the one or more wired and/or wireless communication networks 112. For example, the communication network(s) 112 may include a WiFi network, a cellular network, a public communications network such as the Internet, a private proprietary network, network cables, etc. The server 102 may communicate with the system controller 106 and the smartphone 108 on the same network.

The smartphone 108 may transmit the information regarding the scheduled conference call to the server 102 using a secure encrypted transport layer security (TLS) channel. For example, the smartphone app may organize the information regarding the scheduled conference call into a specified format (e.g., JavaScript Object Notation (JSON) format, etc.) for transmission to the server 102.

The transmitted information may not include personal data of the smartphone 108, so personal data of the smartphone 108 may not be stored on the server 102 or the system controller 106 to provide privacy to a user of the smartphone 108. Similarly, local videoconferencing room data of the system controller 106 may not be stored on the smartphone 108, to protect privacy of local videoconferencing room data.

Once the server 102 receives the information regarding the scheduled conference call from the smartphone 108, the server may send some or all of the information to the system controller 106. The server may redirect the information without any changes, or may revise, augment or update the information before sending to the system controller 106. For example, the server 202 may redirect the information regarding the scheduled conference call received from the smartphone 108 to the system controller 106 without translating the information received from the smartphone 108.

Although FIG. 1 illustrates the server 102 in communication between the smartphone 108 and the system controller 106, in other embodiments the smartphone 108 could communicate directly with the system controller 106 without the server 102. For example, the smartphone 108 could communicate with the system controller 106 via the one or more wired and/or wireless communication networks 112 to transmit information regarding a scheduled conference call directly to the system controller 106 to initiate the scheduled conference call.

The server 102 may be a remote server based in a cloud (e.g., an AMAZON Web Services (AWS) cloud, etc.) at a separate location from the system controller 106, such as a corporate data center server. Alternatively, or in addition a server 102 may be located on the same premises (e.g., on-site) as the system controller 106, etc. For example, the server 102 could be a gateway server that acts as a proxy to direct the scheduled conference call information to the correct system controller 106.

The system controller 106 controls the videoconferencing codec 104 to initiate the scheduled conference call according to the information received from the server 102. For example, the system controller 106 may contain appropriate application programming interfaces (APIs) to control the videoconferencing codec 104. One example system controller is the ROOMREADY GO controller distributed by Zdi, Inc. of Normal, Ill.

The system controller 106 may call a conference phone number according to the scheduled conference call information received from the server 102, according to a session initiation protocol (SIP) uniform resource identifier (URI) associated with the scheduled conference call information, a dial-in phone number associated with the scheduled conference call information, etc. For example, the system controller 106 may transmit commands to the videoconferencing codec 104 using a local secure shell (SSH) Internet protocol (IP) connection from the system controller 106 to the videoconferencing codec 104, using an API of the videoconferencing codec 104, etc.

In some embodiments, the smartphone 108 may display a join button 328 on the user interface 330 according to the obtained information regarding the scheduled conference call, as shown in FIG. 3. The smartphone 108 may then transmit at least a portion of the obtained information regarding the scheduled conference call to the server 102 in response to activation of the join button 328 by the user 110.

In some embodiments, the smartphone app determines a start time of the scheduled conference call according to the obtained information, and displays, highlights, etc. the join button 328 on the user interface 330 a defined time period before the determined start time of the scheduled conference call. As shown in FIG. 3, the join button 328 may be highlighted five minutes prior to the scheduled conference call associated with the join button 328, while another join button 332 is not highlighted because a current time is more than five minutes prior to the scheduled conference call associated with the join button 332.

For example, the smartphone app could display the join button 328 on the user interface 330 at least one minute before the scheduled conference call, at least five minutes before the scheduled conference call, at least one hour before the scheduled conference call, etc.

Alternatively, or in addition, the smartphone app may display the join button 328 on the user interface 330 a defined time period after the determined start time of the scheduled conference call. For example, the smartphone app could display the join button 328 on the user interface 330 at least one minute after the scheduled conference call, at least five minutes after the scheduled conference call, at least one hour after the scheduled conference call, etc.

The join button 328 may include any suitable icon, toggle, switch, field, etc., such as the highlighted green square on the user interface 330 in FIG. 3. The join button 328 may be displayed on a touchscreen of the smartphone 108, etc. In other embodiments, the smartphone 108 may not display a join button and the user may initiate the scheduled conference call by providing input other than activation of a join button.

As described above, the system 100 may allow for joining a conference call using a simple (e.g., one-button) connection from the smartphone 108. For example, as shown in FIG. 3, the user 110 may simply enter a videoconferencing room and the smartphone app on the smartphone 108, then press the join button 328 on the user interface 330 of the smartphone 108 to start a scheduled conference call. Videoconferencing call control, information, etc. may be handled in the background with respect to the user 110. For example, a user may not have to locate a dialer for a meeting, may not have to dial a phone number for the conferencing service (e.g., using WEBEX, GOTOMEETING, ZOOM, BLUE JEAN NETWORKS, SKYPE, CISCO, etc.), may not have to input an ID or PIN for the meeting, etc.

Referring back to FIG. 1, the videoconferencing codec 104 may include a room-based videoconferencing codec, a mobile cart-based videoconferencing codec, a mobile phone-based videoconferencing codec, a mobile tablet-based videoconferencing codec, etc. The videoconferencing codec includes a coder/decoder for audio and for video, and may be used for a conference call including both audio and video, for a call involving only audio if desired, etc.

Because the smartphone app parses information (e.g., calendar events, emails, etc.) stored on the smartphone 108 to obtain information regarding the scheduled conference call, the system 100 is not limited to any specific proprietary hardware and software products and/or services (e.g., CISCO, etc.). Therefore, the system 100 may include any suitable videoconferencing codec 104, may operate with any suitable videoconferencing service provider, etc. A public communications network such as the Internet may be used instead of, or in addition to, a proprietary cloud.

Preferably, there is no need to register the smartphone app of the smartphone 108 with the same cloud-based service (e.g., CISCO SPARK) as the videoconferencing codec 104. Therefore, room-based conferencing components may not have to be registered to a proprietary cloud-based solution, and may not have to use the same proprietary hardware and software. This may allow the smartphone 108 to operate with a variety of different videoconferencing codecs, a variety of different videoconferencing service providers, etc.

Obtaining scheduled conference call information from a personal smartphone 108 as the "source-of-truth" for initiating the conferencing call may eliminate the need to store scheduled conference call information in a central management server, etc. Therefore, in some embodiments there may not be a need to connect or integrate with calendars, an account, etc., outside of the smartphone 108. Information that is required for the conference call such as a conference pin, login credentials, passcode, meeting number, etc., may be passed from the smartphone 108 to the server 102, to the system controller 106, to the videoconferencing codec 104.

In some embodiments, there is no requirement to schedule a videoconferencing room through an infrastructure (e.g., Telepresence Management Suite (TMS), etc.) that is connected to a scheduling system (e.g., OFFICE 365, EXCHANGE, GOOGLE Calendar, etc.). Therefore, no integration may be required between a TMS software scheduling system and the videoconferencing codec 104.

As shown in FIG. 1, the system 100 includes an optional videoconferencing component 114. The system controller 106 is in communication with the videoconferencing component 114 via the one or more wired and/or wireless communication networks 112 to control the videoconferencing component 114.

The videoconferencing component 114 may include any suitable device for a videoconferencing system, such as a television, a monitor, an integrated computer display, a camera, an audio digital signal processor (DSP), a speaker, an audio-visual (AV) switch, and a cable box, etc. Although FIG. 1 illustrates a single videoconferencing component 114, other embodiments may include more than one videoconferencing component 114, no videoconferencing components 114 other than the videoconferencing codec 104, etc.

In some embodiments, the smartphone 108 may only display the join button 328, may only transmit the scheduled conferencing call information to the server 102, etc. when the smartphone 108 is within a vicinity of the system controller 106. For example, the smartphone app may require the smartphone 108 to be within a specified proximity threshold distance of the system controller 106 before displaying the join button 328, before transmitting the scheduled conferencing call information to the server 102, etc.

The smartphone 108 may use any suitable technology to determine whether the system controller 106 is within a vicinity of the smartphone 108. For example, the smartphone 108 may determine signal strengths of beacons that each have an identifier associated with a unique system controller 106 or videoconferencing room housing the system controller 106 at a location of the beacon, the smartphone 108 may compare its global positioning system (GPS) location with a GPS location of the videoconferencing room, the smartphone 108 may compare received signal strengths of wireless access points with a predetermined heat map of wireless access point channels, etc.

In order to leave a room, a "Leave Room" button 334 displayed on user interface 330 of the smartphone 108 may automatically disconnect the initiated conference call when the smartphone 108 leaves the physical proximity of the conferencing room (e.g., leaves a proximity distance threshold of a beacon associated with the system controller 106, etc.), as shown in FIG. 3. The system controller 106 may disconnect communication with the smartphone 108 via the server 102 and shut down when the conferencing room is determined to be vacant.

The system controllers, mobile computing devices, servers, etc. described herein may be configured to perform operations using any suitable combination of hardware and software. For example, the system controllers, mobile computing devices, servers, etc., may include any suitable circuitry, logic gates, microprocessor(s), computer-executable instructions stored in memory, etc. operable to cause the system controllers, mobile computing devices, servers, etc., to perform actions described herein.

According to another example embodiment, a mobile computing device is adapted to communicate with a server via the one or more wired/and or wireless communication networks, and the mobile computing device includes a user interface. The mobile device is configured to parse information stored on the mobile computing device according to a parsing protocol to obtain information regarding a scheduled conference call, and to transmit at least a portion of the information regarding the scheduled conference call to the server in response to user input, to transmit the information regarding the scheduled conference call from the server to a system controller to initiate the scheduled conference call via a videoconferencing codec.

According to a further example embodiment, a method of initiating a videoconferencing call is disclosed. The method includes parsing information stored on a mobile computing device according to a parsing protocol to obtain information regarding a scheduled conference call, and transmitting at least a portion of the information regarding the scheduled conference call to a server in response to user input, to transmit the information regarding the scheduled conference call from the server to a system controller to initiate the scheduled conference call via a videoconferencing codec.

According to yet another example embodiment, a system controller is configured to receive information regarding a scheduled conference call from a mobile computing device via a server, the mobile computing device parsing information stored on the mobile computing device according to a parsing protocol to obtain the information regarding the scheduled conference call. The system controller is configured to control a videoconferencing codec to initiate the scheduled conference call according to the received information.

According to a further example embodiment, a videoconferencing system includes a server, a videoconferencing codec, and a system controller in communication with the videoconferencing codec via one or more wired and/or wireless communication networks to control the videoconferencing codec. The system controller is in communication with the server via the one or more wired and/or wireless communication networks. The system also includes a mobile computing device adapted to communicate with the server via the one or more wired/and or wireless communication networks. The mobile computing device includes a user interface. The mobile device is configured to receive information regarding a conference call from user input, and to transmit at least a portion of the information regarding the conference call to the server. The server is configured to transmit the information regarding the conference call to the system controller, and the system controller configured to initiate the scheduled conference call via the videoconferencing codec. The mobile device may receive and transmit the information regarding the conference call without parsing information stored on the mobile computing device.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A videoconferencing system comprising:
   a server including a hardware processor and a hardware memory;
   a videoconferencing codec;
   a system controller in communication with the videoconferencing codec via at least one of a wired communication network and a wireless communication network to control the videoconferencing codec, the system controller in communication with the server via the at least one of the wired communication network and the wireless communication network; and
   a mobile computing device adapted to communicate with the server via the at least one of the wired communication network and the wireless communication network, the mobile computing device including a user interface, the mobile device configured to parse information stored on the mobile computing device according to a parsing protocol to obtain information regarding a scheduled conference call, to receive a user input, and to transmit at least a portion of the information regarding the scheduled conference call to the server through the at least one of the wired communication network and the wireless communication network using a secure encrypted transport layer security (TLS) channel in response to the user input, where personal data of the mobile computing device is not stored on the system controller and local room data of the system controller is not stored on the mobile computing device, and the obtained information includes a conference phone number of the scheduled conference call and at least one of a personal identification number (PIN), a passcode and a meeting number of the scheduled conference call;
   the server configured to transmit the information regarding the scheduled conference call to the system controller;
   the system controller configured to initiate the scheduled conference call by controlling the videoconferencing codec to dial the conference phone number and enter the at least one of the PIN, the passcode and the meeting number; and
   the mobile computing device configured to display a leave room button on the user interface, and in response to activation of the leave room button by a user, transmit an instruction to disconnect the initiated conference call when the mobile computing device leaves a specified physical proximity distance of the system controller.

2. The system of claim 1, wherein the mobile computing device is configured to display a join button on the user interface according to the information regarding the scheduled conference call, and to transmit the information regarding the scheduled conference call to the server in response to activation of the join button by the user.

3. The system of claim 2, wherein the mobile computing device is configured to determine a start time of the scheduled conference call according to the information regarding the scheduled conference call, and display the join button on the user interface a defined time period before the determined start time of the scheduled conference call.

4. The system of claim 3, wherein the defined time period includes at least one of one minute, five minutes, and one hour.

5. The system of claim 2, wherein the mobile computing device is configured to determine a start time of the scheduled conference call according to the information regarding the scheduled conference call, and display the join button on the user interface for a defined time period after the determined start time of the scheduled conference call.

6. The system of claim 2, wherein the join button comprises an icon on a touchscreen of the mobile computing device.

7. The system of claim 1, wherein the obtained information regarding the scheduled conference call includes a session initiation protocol (SIP) uniform resource identifier (URI).

8. The system of claim 1, wherein the parsing protocol includes searching at least one of multiple stored calendar events and multiple stored emails for at least one of a text string and a numeric string indicative of the scheduled conference call.

9. The system of claim 1, wherein the parsing protocol includes searching stored calendar events within a defined time period for information indicative of the scheduled conference call.

10. The system of claim 9, wherein the defined time period includes at least one of a next hour, a next day, and a next week.

11. The system of claim 1, wherein the server is configured to redirect the information regarding the scheduled conference call received from the mobile computing device to the system controller without translating the information received from the mobile computing device.

12. The system of claim 1, wherein the system controller is configured to disconnect the initiated conference call when a conferencing room in which the system controller is located is determined to be vacant.

13. The system of claim 1, further comprising a videoconferencing component, the system controller in communication with the videoconferencing component via the at least one of the wired communication network and the wireless communication network to control the videoconferencing component.

14. The system of claim 13, wherein the videoconferencing component includes at least one of a television, a monitor, an integrated computer display, a camera, an audio digital signal processor (DSP), a speaker, an audio-visual (AV) switch, and a cable box.

15. The system of claim 1, wherein the mobile computing device comprises a smartphone.

16. The system of claim 1, wherein the information regarding the scheduled conference call is not stored on the server.

17. The system of claim 1, wherein the mobile device is configured to obtain the information regarding the scheduled conference call without requesting information from the server and without establishing a connection to or integration with a calendar or account outside of the mobile computing device.

18. The system of claim 1, wherein the at least a portion of the information regarding the scheduled conference call transmitted from the mobile computing device to the server includes conference login credentials required to establish the scheduled conference call.

\* \* \* \* \*